(12) United States Patent (10) Patent No.: US 8,310,465 B2
Iwasaki et al. (45) Date of Patent: Nov. 13, 2012

(54) TOUCH PANEL AND ELECTRONIC DEVICE INCLUDING TOUCH PANEL

(75) Inventors: Makoto Iwasaki, Akishima (JP);
Toshiharu Nishino, Hamura (JP);
Kazuhiro Sasaki, Sagamihara (JP)

(73) Assignee: Casio Computer Co., Ltd., Tokyo (JP)

( * ) Notice: Subject to any disclaimer, the term of this patent is extended or adjusted under 35 U.S.C. 154(b) by 478 days.

(21) Appl. No.: 12/511,309

(22) Filed: Jul. 29, 2009

(65) Prior Publication Data

US 2010/0026663 A1 Feb. 4, 2010

(30) Foreign Application Priority Data

Jul. 31, 2008 (JP) ................. 2008-197628

(51) Int. Cl.
*G06F 3/045* (2006.01)
(52) U.S. Cl. ..................... 345/174; 345/178
(58) Field of Classification Search .......... 345/173, 345/174, 178, 179, 182, 189
See application file for complete search history.

(56) References Cited

U.S. PATENT DOCUMENTS

| | | | |
|---|---|---|---|
| 6,507,337 B1 | 1/2003 | Sato et al. | |
| 6,522,322 B1 | 2/2003 | Maeda et al. | |
| 6,721,019 B2 | 4/2004 | Kono et al. | |
| 6,965,375 B1* | 11/2005 | Gettemy et al. | 345/173 |
| 7,019,734 B2 | 3/2006 | Cross et al. | |
| 7,034,808 B2* | 4/2006 | Sakata et al. | 345/173 |
| 2002/0085165 A1* | 7/2002 | Fukumoto et al. | 349/187 |
| 2005/0140917 A1 | 6/2005 | Miura et al. | |
| 2005/0174525 A1* | 8/2005 | Tsuboi et al. | 349/158 |
| 2007/0128948 A1* | 6/2007 | Nakanishi et al. | 439/660 |
| 2008/0303798 A1 | 12/2008 | Matsudate et al. | |
| 2010/0225606 A1 | 9/2010 | Sasaki | |
| 2010/0225613 A1 | 9/2010 | Iwasaki | |

FOREIGN PATENT DOCUMENTS

| | | |
|---|---|---|
| JP | 61-45519 A | 3/1986 |
| JP | 8-286812 A | 11/1996 |
| JP | 2000-284913 A | 10/2000 |
| JP | 2001-76886 A | 3/2001 |

(Continued)

OTHER PUBLICATIONS

U.S. Appl. No. 12/716,629, filed Mar. 3, 2010, Makoto Iwasaki, "Touch Panel".

(Continued)

*Primary Examiner* — Quan-Zhen Wang
*Assistant Examiner* — Calvin C Ma
(74) *Attorney, Agent, or Firm* — Holtz, Holtz, Goodman & Chick, PC

(57) ABSTRACT

A resistive film type touch panel includes first and second resistive films respectively provided on the inner surfaces of a pair of substrates on the touch side and the opposite side, protruding contacts which are provided on the first resistive film so as to protrude to a predetermined height, and come into contact with the second resistive film upon bending/deformation of the touch-side substrate by a touch to electrically connect the touch-side substrate to the second resistive film, insulating spacers which are arranged between the substrates except the positions of the protruding contacts, and define the space between the substrates to a height higher than that of protruding contacts, and a liquid or liquid crystal sealed in the space between the substrates. This arrangement reduces the bending/deformation amount of the touch-side substrate and the refraction of transmitted light at a portion bent/deformed by a touch on the touch-side substrate.

19 Claims, 7 Drawing Sheets

FOREIGN PATENT DOCUMENTS

| | | |
|---|---|---|
| JP | 2002-41231 A | 2/2002 |
| JP | 2002-231098 A | 8/2002 |
| JP | 2002-287902 A | 10/2002 |
| JP | 2005-250119 A | 9/2005 |
| JP | 2005-533323 A | 11/2005 |
| JP | 2007-095044 A | 4/2007 |
| JP | 2007-324097 A | 12/2007 |
| KR | 2008-0049305 A | 6/2008 |

OTHER PUBLICATIONS

U.S. Appl. No. 12/716,685, filed Mar. 3, 2010, Kazuhiro Sasaki, "Touch Panel".

Japanese Office Action dated Mar. 22, 2011 and English translation thereof in Japanese Application No. 2009-051027, which is a Japanese counterpart of related U.S. Appl. No. 12/716,685.

Japanese Office Action dated Mar. 22, 2011 and English translation thereof in Japanese Application No. 2009-051026, which is a Japanese counterpart of related U.S. Appl. No. 12/716,629.

Korean Office Action dated Jan. 13, 2011 and English translation thereof in counterpart Korean Application No. 10-2009-0068950.

Japanese Office Action dated Jun. 22, 2010 and English translation thereof, issued in counterpart Japanese Application No. 2008-197628.

Japanese Office Action dated Mar. 22, 2011 and English translation thereof in counterpart Japanese Application No. 2009-051027.

"Phases of Liquid Crystals" (in English): pp. 1-6: (http://web.archive.org/web/20080410144550/http://plc.cwru.edu/tutorial/enhanced/files/lc/phase/phase.htm).

* cited by examiner

TOUCH PANEL AND ELECTRONIC DEVICE INCLUDING TOUCH PANEL

CROSS-REFERENCE TO RELATED APPLICATIONS

This application is based upon and claims the benefit of priority from prior Japanese Patent Application No. 2008-197628, filed Jul. 31, 2008, the entire contents of which are incorporated herein by reference.

BACKGROUND OF THE INVENTION

1. Field of the Invention

The present invention relates to a resistive film type touch panel and an electronic device including a resistive film type touch panel.

2. Description of the Related Art

A resistive film type touch panel is configured such that a first substrate on which a first resistive film is formed and a second substrate on which a second resistive film is formed are arranged so as to make the first and second resistive films face each other. When a user touches the outer surface of the substrate on the touch side, the substrate bends and deforms. As a consequence, the resistive film on this touch-side substrate comes into contact with the resistive film on the opposite-side substrate at the touched portion. The touch panel then detects the contact position between the first resistive film and the second resistive film. In this resistive film type touch panel, the space between the pair of substrates is defined by spacers or sealed with an insulating liquid to prevent the resistive film on the inner surface of the touch-side substrate from accidentally coming into contact with the resistive film on the inner surface of the opposite-side substrate when no touch input is performed.

BRIEF SUMMARY OF THE INVENTION

According to an aspect of the invention, a touch panel includes a first substrate on which a first resistive film is formed, a second substrate on which a second resistive film is formed, the second substrate being arranged so that the second resistive film faces the first resistive film, a frame-like seal member which is arranged between the first substrate and the second substrate to bond the first substrate to the second substrate, an insulating spacer which is arranged in an area surrounded by the seal member and holds a space between the first substrate and the second substrate at a first thickness, a protruding contact which is formed in the area surrounded by the seal member so as to protrude from the first substrate to the second substrate or from the second substrate to the first substrate and give a gap between the facing substrates, and a liquid or liquid crystal which is sealed in the area surrounded by the seal member between the first substrate and the second substrate.

According to another aspect of the invention, a touch panel includes a first substrate on which a first resistive film is formed, a second substrate on which a second resistive film is formed, the second substrate being arranged so that the second resistive film faces the first resistive film, a frame-like seal member which is arranged between the first substrate and the second substrate to bond the first substrate to the second substrate, insulating spacers which are arranged in an area surrounded by the seal member and hold a space between the first substrate and the second substrate at a first thickness, protruding contacts which are formed in the area surrounded by the seal member so as to protrude from the first substrate to the second substrate or from the second substrate to the first substrate and give a gap between the facing substrates, and a liquid or liquid crystal which is sealed in the area surrounded by the seal member between the first substrate and the second substrate.

According to still another aspect of the invention, an electronic device includes a touch panel which includes a first substrate on which a first resistive film is formed, a second substrate on which a second resistive film is formed, the second substrate being arranged so that the second resistive film faces the first resistive film, a frame-like seal member which is arranged between the first substrate and the second substrate to bond the first substrate to the second substrate, insulating spacers which are arranged in an area surrounded by the seal member at equal intervals and hold a space between the first substrate and the second substrate at a first thickness, protruding contacts which are formed in the area surrounded by the seal member so as to protrude from the first substrate to the second substrate or from the second substrate to the first substrate and give a gap between the facing substrates, and a liquid or liquid crystal which is sealed in the area surrounded by the seal member between the first substrate and the second substrate.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

Figure 1:
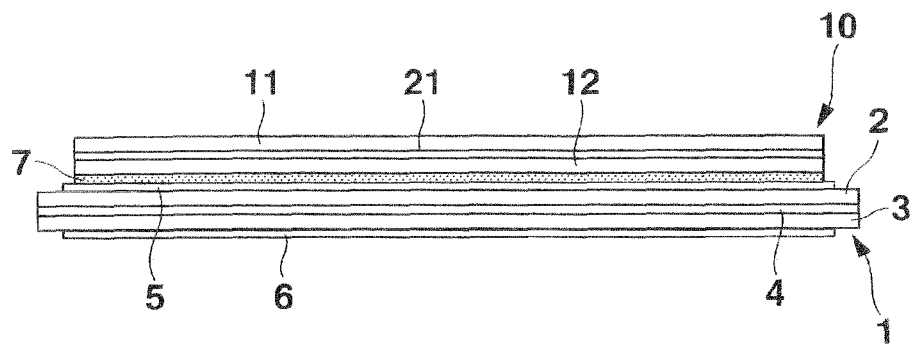
FIG. 1 is a side view of a display apparatus with a touch panel according to the first embodiment of the present invention.
Figure 2:
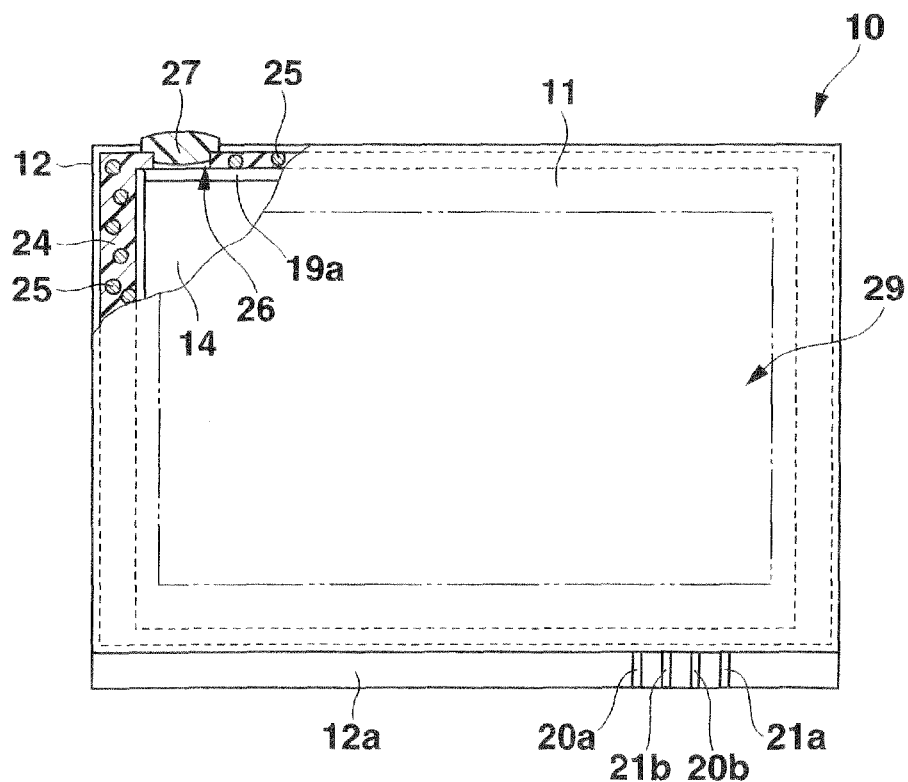
FIG. 2 is a plan view of the touch panel of the first embodiment.
Figure 3:
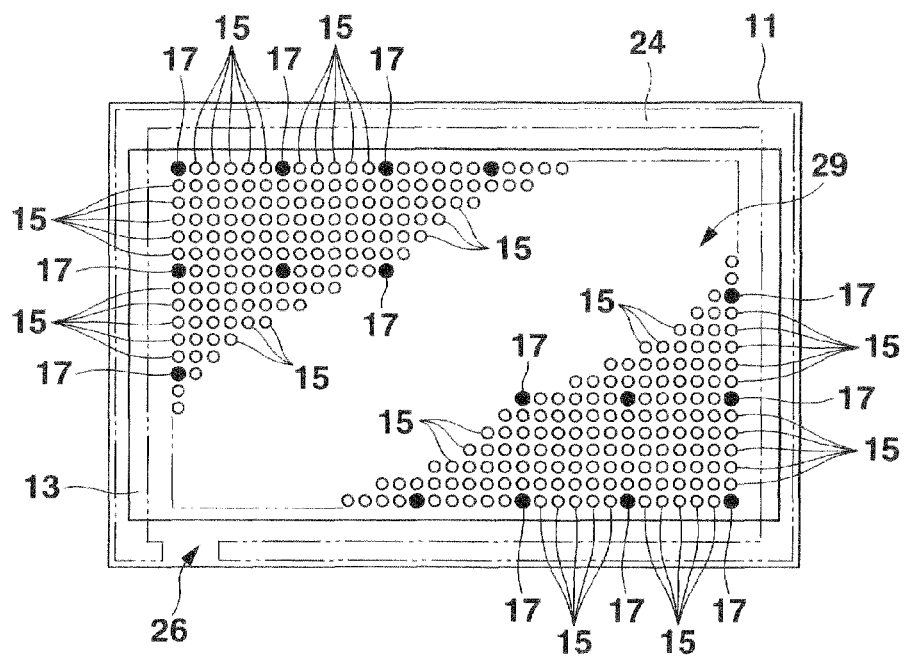
FIG. 3 is a plan view of the touch-side substrate of the touch panel as viewed from the inner surface side.
Figure 4:
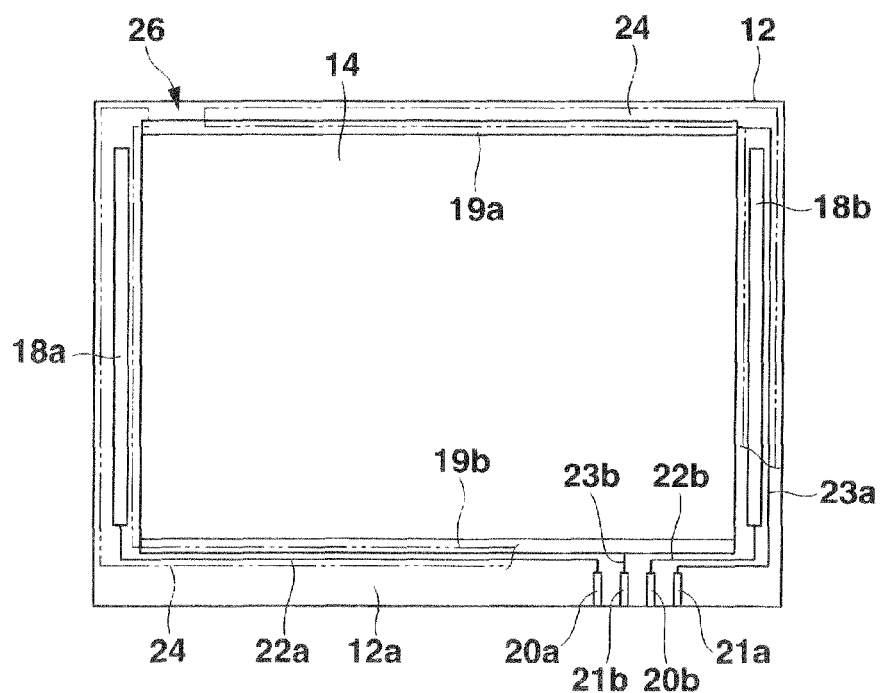
FIG. 4 is a plan view of the opposite-side substrate of the touch panel as viewed from the inner surface side.
Figure 5:
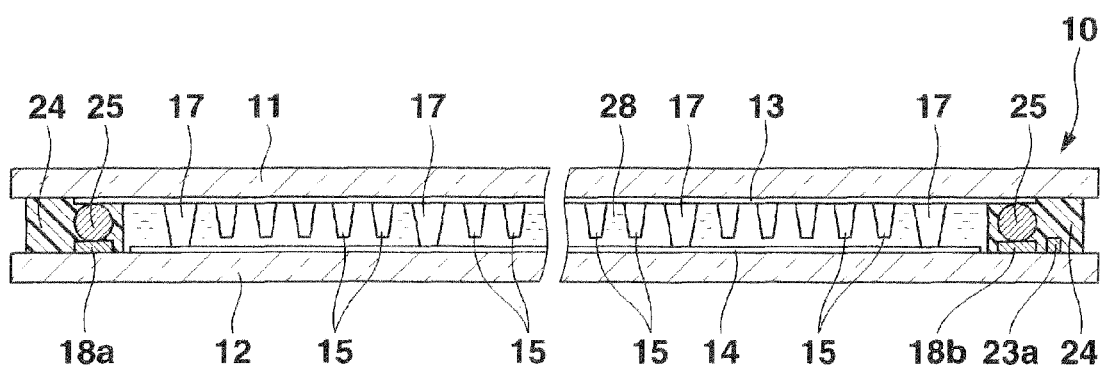
FIG. 5 is a sectional view of the touch panel.
Figure 6:
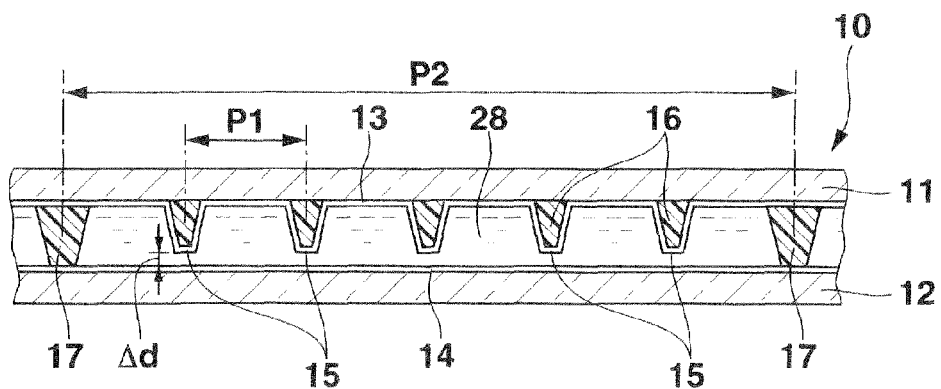
FIG. 6 is an enlarged sectional view of part of the touch panel.
Figure 7A:
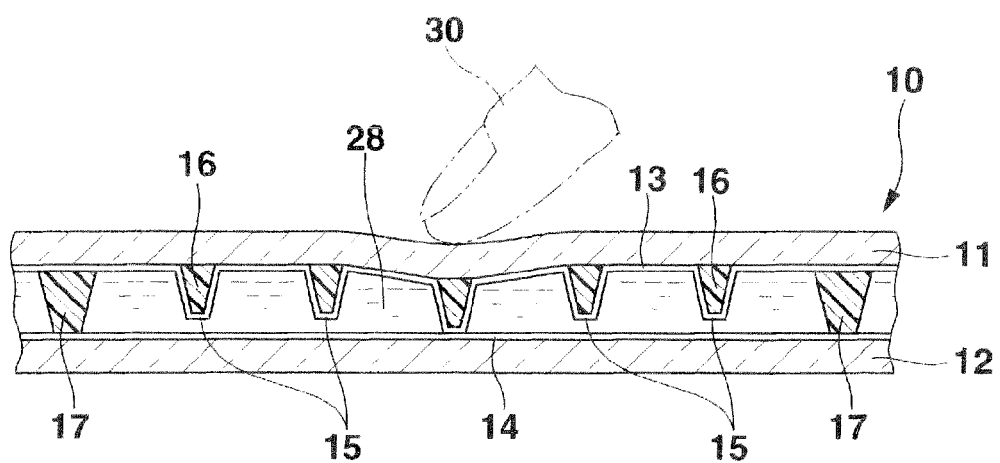
FIGS. 7A and 7B are enlarged sectional views of part of the touch panel at the time of touch input.
Figure 7B:
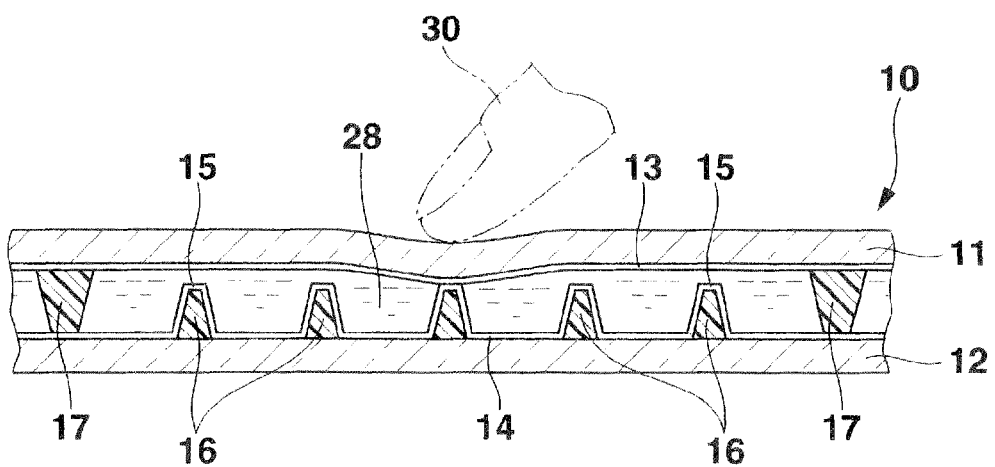
Figure 8:
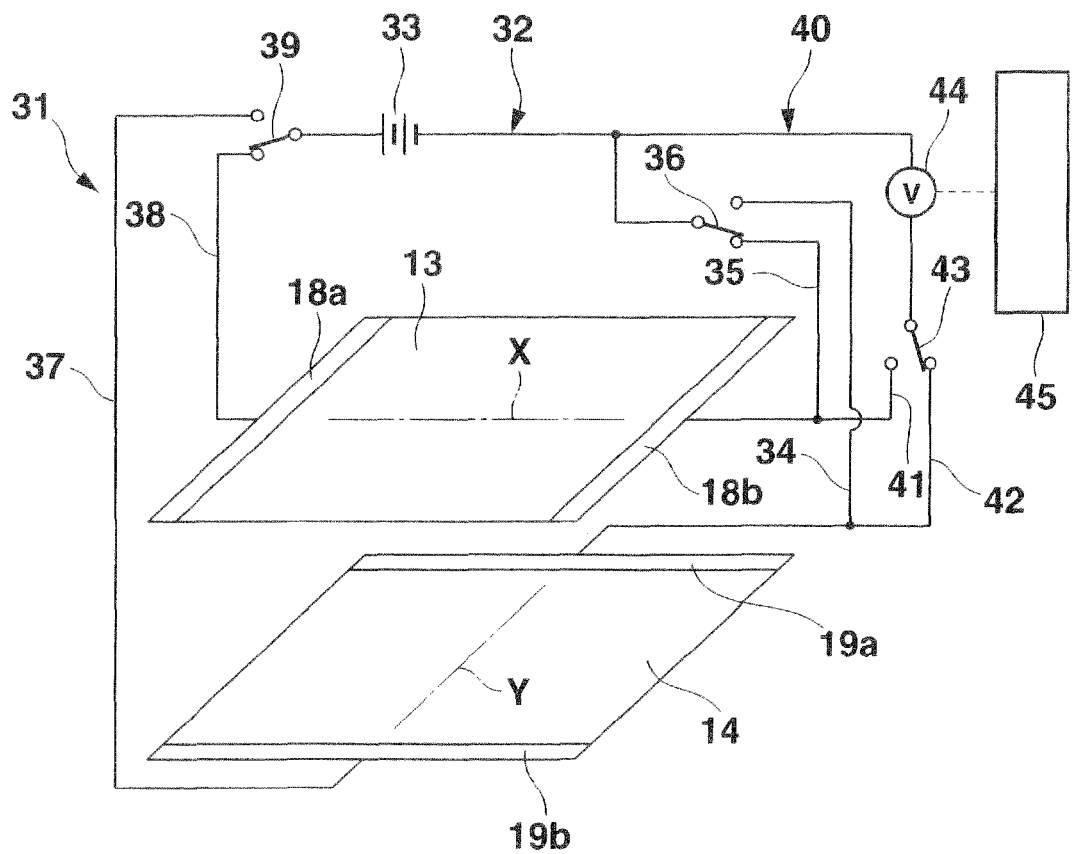
FIG. 8 is a view showing a touch panel driving circuit.

FIGS. 1 to 8 show the first embodiment of the present invention. FIG. 1 is a side view of a display apparatus with a touch panel. FIG. 2 is a plan view of the touch panel. FIG. 3 is a plan view of the touch-side substrate of the touch panel as viewed from the inner surface side. FIG. 4 is a plan view of the opposite-side substrate of the touch panel as viewed from the inner surface side. FIG. 5 is a sectional view of the touch panel. FIG. 6 is an enlarged sectional view of part of the touch panel. FIGS. 7A and 7B are enlarged sectional views of part of the touch panel at the time of touch input. FIG. 8 is a view showing a touch panel driving circuit.

The display apparatus with the touch panel shown in FIG. 1 will be described first. This display apparatus includes a display panel 1 to display images and a resistive film type touch panel 10 placed on the observation side of the display panel 1.

The display panel 1, which is, for example, a liquid crystal display panel, includes a pair of transparent substrates 2 and 3 on the observation side and the opposite side which are arranged to face each other through a predetermined space and are joined to each other at their peripheral portions through a frame-like seal member 4, transparent electrodes (not shown) respectively provided on the facing inner surfaces of the pair of transparent substrates 2 and 3 to form pixels in areas facing each other, a liquid crystal (not shown) sealed in the area surrounded by the seal member 4 in the space between the pair of substrates 2 and 3, and polarizing plates 5 and 6 respectively arranged on the outer surfaces of the pair of substrates 2 and 3.

Note that this liquid crystal display panel may be one of the following: a TN liquid crystal display panel, STN liquid crystal display panel, non-twisted, homogeneously aligned liquid crystal display panel, vertically aligned liquid crystal display panel, bend-aligned liquid crystal display panel, and ferroelectric or antiferroelectric liquid crystal display panel. The liquid crystal display panel is not limited to the one with electrodes for forming pixels being respectively provided on the inner surfaces of a pair of substrates, and may be of a lateral electric field control type in which the inner surface of one of a pair of substrates is provided with a first electrode for forming pixels and a second electrode which has elongated electrode portions and is formed to be closer to the liquid crystal layer side than the first electrode and insulated from it, and the aligned state of liquid crystal molecules is changed by generating a lateral electric field (an electric field in a direction along the substrate surface) between the electrodes.

In addition, the display panel 1 is not limited to a liquid crystal display panel but may be an electroluminescence display panel or the like.

The touch panel 10 is placed on the observation side of the liquid crystal display panel 1 and is bonded to the outer surface of the observation-side polarizing plate 5 of the liquid crystal display panel 1 with a bonding layer 7 made of a transparent adhesive material or resin.

As shown in FIGS. 2 to 7A and 7B, the touch panel 10 includes a pair of transparent substrates 11 and 12, first and second transparent resistive films 13 and 14, protruding contacts 15, insulating spacers 17, a frame-like seal member 24, and an insulating liquid 28. The pair of substrates 11 and 12 are respectively arranged on the touch side and the opposite side so as to face each other. The first and second resistive films 13 and 14 are respectively provided on the facing inner surfaces of the pair of substrates 11 and 12. The protruding contacts 15 are provided at positions on one of the first and second resistive films 13 and 14, e.g., the first resistive film 13 provided on the inner surface of the touch-side substrate 11, so as to protrude from the surface of the first resistive film 13 by a predetermined height. The protruding contact 15 comes into contact with the other resistive film, i.e., the second resistive film 14 provided on the inner surface of the opposite-side substrate 12 due to the pressing force generated by a touch on the outer surface of the touch-side substrate 11. The protruding contact 15 then electrically connects the first resistive film 13 to the second resistive film 14 at the touched portion. The insulating spacers 17 are arranged at positions between the pair of substrates 11 and 12, other than the positions of the protruding contacts 15, to define the space between the pair of substrates 11 and 12 (the space between the first and second resistive films 13 and 14) to a value larger than the height of the protruding contacts 15. The seal member 24 seals the space between the pair of substrates 11 and 12 throughout the peripheral portions of the substrates 11 and 12. The insulating liquid 28 is sealed in the space surrounded by the seal member 24 between the pair of substrates 11 and 12.

The touch-side substrate 11 of the pair of substrates 11 and 12 is made of a glass plate or resin film formed in a rectangular shape. The opposite-side substrate 12 is made of a glass plate formed in a rectangular shape having nearly the same size as that of the touch-side substrate 11, with an overhanging portion 12a protruding outside the touch-side substrate 11 being integrally formed with one edge portion of the opposite-side substrate 12.

Although not shown in the accompanying drawings, $SiO_2$ films are provided on the entire inner surfaces of the pair of substrates 11 and 12, and the first and second resistive films 13 and 14 are made of ITO films formed on the $SiO_2$ films.

The touch panel 10 of this embodiment is configured such that a rectangular area inside the seal portion formed by the frame-like seal member 24 is set as a touch area 29 for touch input. The first and second resistive films 13 and 14 each are formed in a rectangular shape larger than the touch area 29 and smaller than the outer shape of the seal portion described above.

The protruding contacts 15 are arranged in an array pattern in which they are arranged in an area corresponding to the touch area 29 of the first resistive film 13 provided on the inner surface of the touch-side substrate 11 at a predetermined pitch in two orthogonal directions, e.g., the horizontal and vertical directions of the touch area 29, and non-contact portions are provided by omitting one protruding contact 15 for every predetermined number of protruding contacts 15 in each of the contact arrays in the two directions.

The protruding contacts 15 are formed by providing, at positions on the inner surface of the touch-side substrate 11, projections 16 made of transparent insulating members corresponding to the height of the protruding contacts 15, and forming the first resistive film 13 so as to cover the projections 16.

The spacers 17 are columnar spacers which are provided on the inner surface of one of the pair of substrates 11 and 12 and are in contact with the inner surface of the other substrate. In this embodiment, the columnar spacers 17 are provided on the first resistive film 13 provided on the inner surface of the touch-side substrate 11, on which the protruding contacts 15 are provided, one by one in each of the non-contact portions, of the first resistive film 13, in which the protruding contacts 15 are not formed. Note that, referring to FIG. 3, the columnar spacers 17 are filled in black for easy discrimination between the protruding contacts 15 and the columnar spacers 17.

The columnar spacers 17 are arranged in the area surrounded by the frame-like seal member 24, i.e., the area corresponding to the touch area 29, at the four corner portions of each predetermined rectangular area, e.g., each square area, in correspondence with the above arrangement of the insulating spacers 17. The protruding contacts 15 are provided in the area corresponding to the touch area 29 in twos or more between each pair of adjacent columnar spacers 17 in correspondence with the above arrangement of the protruding contacts 15.

Both the projections 16 for the formation of the protruding contacts 15 and the columnar spacers 17 are formed by coating the substrate with a transparent photo-setting resin with a predetermined thickness and exposing and developing the resin film. When the exposed resin film is developed, a portion of the resin film which is closer to the film surface is exposed to a developing solution for a longer period of time. For this reason, the projections 16 and the columnar spacers 17 each are formed into a shape whose diameter decreases from its proximal end portion to its protruding end.

FIGS. 5 to 7B greatly exaggerate the heights of the protruding contacts 15 and columnar spacers 17. Although the projections 16 and the columnar spacers 17 which are formed in the above manner are shown in these drawings with their heights being exaggerated, the actual tilt angles of these circumferential surfaces (the angles relative to the surface of the touch-side substrate 11) are 40° to 50°. It is therefore possible to form the protruding contacts 15 by forming the first resistive film 13 so as to entirely cover the projections 16.

More specifically, the protruding contacts 15 each are formed into a shape having a circular cross-section parallel to the surface of the touch-side substrate 11, a proximal end diameter of 15 µm or 30 µm, and a height of 2.0 µm. The columnar spacers 17 each are formed into a shape having a circular cross-section parallel to the surface of the substrate 11, a proximal end diameter of 30 µm, and a height of 2.5 µm, 3.0 µm, or 4.0 µm.

The protruding contacts 15 are arrayed in each of the above two directions (the horizontal and vertical directions of the touch area 29) at a pitch P1 of 0.05 mm, 0.1 mm, or 0.2 mm. The columnar spacers 17 provided in the non-contact portions from which the protruding contacts 15 are omitted are arranged in each of the above two directions at a pitch P2 of 2 mm or 4 mm.

Referring to FIGS. 3 and 5 to 7B, for the sake of descriptive convenience, one spacer 17 is placed for every 5 protruding contacts 15. However, if the pitch P1 of the protruding contacts 15 and the pitch P2 of the spacers 17 are set as P1=0.05 mm and P2=2 mm, one spacer 17 is placed for every 38 protruding contacts 15. If P1=0.2 mm and P2=4 mm, one spacer 17 is placed for every 18 protruding contacts 15.

The overhanging portion 12a of the opposite-side substrate 12 is provided with, for example, four driving circuit connecting terminals 20a, 20b, 21a, and 21b to connect, to a touch panel driving circuit 31 shown in FIG. 8, the two ends of the first resistive film 13 provided on the touch-side substrate 11 in one direction, e.g., the horizontal direction of the touch area 29 (to be referred to as the X-axis direction hereinafter) and the two ends of the second resistive film 14 provided on the opposite-side substrate 12 in a direction perpendicular to the above one direction, i.e., the vertical direction of the touch area 29 (to be referred to as the Y-axis direction hereinafter).

The inner surface of the opposite-side substrate 12 on which the overhanging portion 12a is formed is provided with first electrodes 18a and 18b respectively facing the edge portions of the two ends of the first resistive film 13, provided on the touch-side substrate 11, in the X-axis direction, second electrodes 19a and 19b formed on the edge portions of the two ends of the second resistive film 14, provided on the opposite-side substrate 12, in the Y-axis direction, and lines 22a, 22b, 23a, and 23b which respectively connect the first electrodes 18a and 18b and the second electrodes 19a and 19b to the four driving circuit connecting terminals 20a, 20b, 21a, and 21b provided on the overhanging portion 12a.

In this embodiment, the first resistive film 13 provided on the touch-side substrate 11 is shaped such that the side portions of the two ends in the X-axis direction correspond to the seal portion formed by the frame-like seal member 24, and the side portions of the two ends in the Y-axis direction perpendicular to the X-axis direction are located inside the seal portion. The second resistive film 14 provided on the opposite-side substrate 12 is shaped such that the side portions of the two ends in the X-axis direction are located inside the seal portion, and the side portions of the two ends in the Y-axis direction are located near the seal portion or correspond to it.

The first electrodes 18a and 18b respectively facing the side portions of the two ends of the first resistive film 13 in the X-axis direction are provided to correspond to the seal portion. The second electrodes 19a and 19b formed on the side portions of the two ends of the second resistive film 14 in the Y-axis direction are stacked on the second resistive film 14.

Note that the touch panel 10 of this embodiment is configured such that the first electrodes 18a and 18b are provided one by one on the side portion of one end of the first resistive film 13 in the X-axis direction and the side portion of the other end so as to face each other, and the second electrodes 19a and 19b are provided one by one on the side portion of one end of the second resistive film 14 in the Y-axis direction and the side portion of the other end so as to face each other. The two first electrodes 18a and 18b are formed into continuous strip shapes facing almost the entire lengths of the side portions of the two ends of the first resistive film 13 in the X-axis direction. The two second electrodes 19a and 19b are formed into strip shapes continuously extending throughout almost the entire lengths of the side portions of the two ends of the second resistive film 14 in the Y-axis direction.

The two first electrodes 18a and 18b and the two second electrodes 19a and 19b are respectively connected to the four driving circuit connecting terminals 20a, 20b, 21a, and 21b provided on the overhanging portion 12a through the lines 22a, 22b, 23a, and 23b (four lines in this embodiment) arranged on the portions corresponding to the seal portion.

Note that the first electrodes 18a and 18b, the second electrodes 19a and 19b, the driving circuit connecting terminals 20a, 20b, 21a, and 21b, and the lines 22a, 22b, 23a, and 23b are formed by stacking and forming a first layer made of molybdenum, a second layer made of an aluminum-based alloy, and a third layer made of molybdenum on the opposite-side substrate 12 or the second resistive film 14 and patterning the three-layer film.

The side portions of the two ends of the first resistive film 13 in the X-axis direction are respectively connected to the two first electrodes 18a and 18b through conductive members at the seal portion. In this embodiment, spherical conductive particles 25, each having a diameter corresponding to the space between the pair of substrates 11 and 12, which is defined by the columnar spacers 17, are dispersed on the frame-like seal member 24 as conductive members for connecting the side portions of the two ends of the first resistive film 13 in the X-axis direction to the two first electrodes 18a and 18b.

The seal member 24 is printed on the inner surface of one of the pair of substrates 11 and 12 in a shape provided with a liquid inlet 26 formed by partially notching the side portion corresponding to the edge portion on the opposite side to the side on which the overhanging portion 12a of the opposite-side substrate 12 is formed. Bringing the columnar spacers 17 provided on the inner surface (on the first resistive film 13) of the touch-side substrate 11 of the pair of substrates 11 and 12 into contact with the inner surface (on the second resistive film 14) of the opposite-side substrate 12 causes the columnar spacers 17 to define the space between the substrates 11 and 12. Hardening the seal member 24 in this state joins the substrates to each other through the seal member 24.

The side portions of the two ends of the first resistive film 13, provided on the touch-side substrate 11, in the X-axis direction are electrically connected to the two first electrodes 18a and 18b respectively provided on the opposite-side substrate 12 so as to face the side portions of the two ends of the first resistive film 13 in the X-axis direction through the conductive particles 25, of the spherical conductive particles 25 dispersed in the seal member 24, which are sandwiched between the first resistive film 13 and the first electrodes 18a and 18b by joining the pair of substrates 11 and 12 through the seal member 24.

The insulating liquid or insulating liquid crystal 28 is sealed in the space surrounded by the seal member 24 between the pair of substrates 11 and 12 in the following manner. A hermetic chamber is evacuated to a vacuum. In this chamber, the liquid inlet 26 is dipped in a bath containing the insulating liquid or insulating liquid crystal 28. In this state, the internal pressure of the chamber is restored to atmospheric pressure to inject the insulating liquid or insulating liquid crystal 28 into the space between the pair of substrates 11 and 12 through the liquid inlet 26 by using the pressure difference between the inside of the chamber and the space between the pair of substrates 11 and 12, thereby filling the space with the insulating liquid or insulating liquid crystal 28. The liquid inlet 26 is sealed by a sealing resin 27 after the space is filled with the insulating liquid or insulating liquid crystal 28.

The insulating liquid or insulating liquid crystal preferably has a resistivity of $10^8$ Ω·cm or more at room temperature.

The insulating liquid or insulating liquid crystal 28 is a transparent liquid exhibiting a refractive index difference of 0.1 or less with respect to light relative to the pair of substrates 11 and 12. That is, if the pair of substrates 11 and 12 are glass plates, the refractive index of the substrates 11 and 12 is approximately 1.5, and the insulating liquid 28 has a refractive index falling within the range of approximately 1.4 to 1.5. The insulating liquid 28 preferably has a refractive index closer to that of the pair of substrates 11 and 12, i.e., approximately 1.5.

In this embodiment, as the insulating liquid or insulating liquid crystal 28, a liquid which is optically isotropic at room temperature, e.g., a liquid crystal exhibiting an isotropic phase at a temperature of 5° C. or more (a nematic liquid crystal having an N–I point of less than 5° C.), is sealed in the space between the pair of substrates 11 and 12. More specifically, as a liquid crystal having such characteristics, a liquid crystal material having two or three cyclohexane or benzene rings, alkyl groups at the two terminals of each ring, and almost no dielectric anisotropy can be used.

The touch panel 10 is used for touch input with a finger tip 30 or the like from the outer surface side of the touch-side substrate 11. As shown in FIG. 7A or 7B, when the user touches the outer surface of the touch-side substrate 11, the touch-side substrate 11 bends and deforms in the direction of the inner surface by the touch on the outer surface. As a result, the protruding contact 15, of the protruding contacts 15 provided at positions on the first resistive film 13 on the inner surface of the touch-side substrate 11, which is located on the bent/deformed portion of the touch-side substrate 11 comes into contact with the second resistive film 14 on the inner surface of the opposite-side substrate 12. The first resistive film 13 is then electrically connected to the second resistive film 14 at the portion corresponding to the touched point.

The coordinates of the touched point in the X- and Y-axis directions can therefore be detected based on voltage values obtained by causing the touch panel driving circuit 31 to alternately apply a voltage of a predetermined value between the two ends of the first resistive film 13 in the X-axis direction and between the two ends of the second resistive film 14 in the Y-axis direction, and measuring the voltage value at one end of the second resistive film 14, generated when the voltage is applied to the first resistive film 13, and the voltage value at one end of the first resistive film 13, generated when the voltage is applied to the second resistive film 14.

As shown in FIG. 8, the touch panel driving circuit 31 includes a voltage applying circuit 32 for alternately applying a voltage of a predetermined value between the two ends of the first resistive film 13 in the X-axis direction and between the two ends of the second resistive film 14 in the Y-axis direction, a voltage measurement system 40 which measures the voltage generated between a predetermined point A on the voltage applying circuit 32 and one end of the first resistive film 13 in the X-axis direction or one end of the second resistive film 14 in the Y-axis direction when the first resistive film 13 becomes conductive to the second resistive film 14 through the protruding contact 15 corresponding to the bent/deformed portion of the touch-side substrate 11, and a coordinate detection means 45 for detecting the coordinates of the touched point based on the value measured by the voltage measurement system 40.

The voltage applying circuit 32 includes a constant voltage source 33, a first connection switch 36 which selectively applies the electric potential of one pole (the negative pole in FIG. 8) of the constant voltage source 33 to one end of the first resistive film 13 in the X-axis direction and one end of the second resistive film 14 in the Y-axis direction through first resistive film connecting lines 34 and 35 respectively connected to the one end of the first resistive film 13 in the X-axis direction and the one end of the second resistive film 14 in the Y-axis direction, and a second connection switch 39 which selectively applies the electric potential of the other pole (the positive pole in FIG. 8) of the constant voltage source 33 to the other end of the first resistive film 13 in the X-axis direction and the other end of the second resistive film 14 in the Y-axis direction through second resistive film connecting lines 37 and 38 respectively connected to the other end of the first resistive film 13 in the X-axis direction and the other end of the second resistive film 14 in the Y-axis direction. Although the constant voltage source 33 shown in FIG. 2 is a DC power supply, this voltage source may be a power supply which applies an alternating voltage.

The voltage measurement system 40 includes a third connection switch 43 which selectively applies one of the electric potential at the one end of the first resistive film 13 in the X-axis direction and the electric potential at the one end of the second resistive film 14 in the Y-axis direction to a voltage measurement means 44 through third resistive film connecting lines 41 and 42 respectively connected to the one end of the first resistive film 13 in the X-axis direction and the one end of the second resistive film 14 in the Y-axis direction, and the voltage measurement means 44 interposed between one pole (the negative pole in FIG. 8) of the constant voltage source 33 and the third connection switch 43.

A control means (not shown) causes the voltage applying circuit 32 to switch, at a predetermined period, e.g., a period of 0.1 sec, the first and second connection switches 36 and 39 to the side (the state in FIG. 8) where the two ends of the first resistive film 13 in the X-axis direction are connected to the constant voltage source 33 and the side where the two ends of the second resistive film 14 in the Y-axis direction are connected to the constant voltage source 33, thereby alternately applying a voltage of a predetermined value of the constant voltage source 33 between the two ends of the first resistive film 13 in the X-axis direction and between the two ends of the second resistive film 14 in the Y-axis direction.

The coordinate detection means 45, which is controlled by control means (not shown), detects the coordinate of the touched point in the X-axis direction (to be referred to as the X-coordinate hereinafter) based on the value measured by the voltage measurement means 44 when the above voltage is applied between the two ends of the first resistive film 13 in the X-axis direction, and the coordinate of the touched point in the Y-axis direction (to be referred to as the Y-coordinate hereinafter) based on the value measured by the voltage measurement means 44 when the above voltage is applied between the two ends of the second resistive film 14 in the Y-axis direction.

The voltage measurement means 44 detects the X- and Y-coordinates of the touched point based on the values measured by the voltage measurement means 44 by the following calculation.

Assume that the voltage value of the constant voltage source 33 is V0, the X-coordinate value of one end of the first resistive film 13 in the X-axis direction is 0, the X-coordinate value of the other end of the first resistive film 13 in the X-axis direction is 1, the X-coordinate of the touched point is x, the resistance value between the two ends of the first resistive film 13 in the X-axis direction is rx, and the internal resistance value of the voltage measurement means 44 is R. In this case, since rx<<R, a measured voltage value V(x) obtained by the voltage measurement means 44 when the voltage V0 is applied between the two ends of the first resistive film 13 in the X-axis direction can be expressed as $$V(x)=V0(1-x)$$

Assume also that the Y-coordinate value of one end of the second resistive film 14 in the Y-axis direction is 0, the Y-coordinate value of the other end of the second resistive film 14 in the Y-axis direction is 1, the Y-coordinate of the touched point is y, and the resistance value between the two ends of the second resistive film 14 in the Y-axis direction is ry. In this case, since ry<<R, a measured voltage value V(y) obtained by the voltage measurement means 44 when the voltage V0 is applied between the two ends of the second resistive film 14 in the Y-axis direction can be expressed as $$V(y)=V0(1-y)$$

The X- and Y-coordinates x and y of the touched point can therefore be obtained by $$x=1-V0/V(x)$$

$$y=1-V0/V(y)$$

The above touch panel 10 is provided with the two first electrodes 18a and 18b formed into continuous strip shapes so as to face almost the entire lengths of the side portions of the two ends of the first resistive film 13 in the X-axis direction, and the two second electrodes 19a and 19b formed into strip shapes on the side portions of the two ends of the second resistive film 14 in the Y-axis direction so as to continuously extend throughout almost the entire lengths of the side portions. The first electrodes 18a and 18b and the second electrodes 19a and 19b are respectively connected to the driving circuit connecting terminals 20a, 20b, 21a, and 21b provided on the overhanging portion 12a of the opposite-side substrate 12 through the lines 22a, 22b, 23a, and 23b. This arrangement allows the voltage alternately applied, by the touch panel driving circuit 31, between the two ends of the first resistive film 13 in the X-axis direction and between the two ends of the second resistive film 14 in the Y-axis direction to evenly act in almost the entire areas of the first resistive film 13 and the second resistive film 14. This makes it possible to accurately detect the X-coordinate x and Y-coordinate y of the touched point.

Note that the display apparatus with the touch panel shown in FIG. 1 allows the user to perform touch input like keyboard input by causing the display panel 1 to display key patterns and selectively touching portions corresponding to the key patterns on the touch panel 10. In addition, when the display panel 1 displays an image and the user touches an arbitrary point on the touch panel 10, this apparatus can make the display panel 1 display an enlarged image centered on the touched point. Furthermore, when the user moves a touched point on the touch panel 10 in an arbitrary direction, the device can scroll the displayed image on the display panel 1.

The touch panel 10 is configured such that the protruding contacts 15 provided at positions on the first resistive film 13 on the inner surface of the touch-side substrate 11 protrude from the surface of the resistive film 13. When the touch-side substrate 11 bends and deforms as the user touches its outer surface, the first resistive film 13 is locally electrically connected to the second resistive film 14 on the inner surface of the opposite-side substrate 12 through the protruding contact 15 at a portion corresponding to the touched point. This makes it possible to sufficiently reduce the bending/deformation amount of the touch-side substrate 11 which is required to locally electrically connect the first resistive film 13 to the second resistive film 14 as compared with the space between the pair of substrates 11 and 12.

That is, as described in the above embodiment, since the protruding contacts 15 are formed to a height of 2.0 µm and the columnar spacers 17 are formed to a height of 2.5 µm, 3.0 µm, or 4.0 µm, a gap Δd (see FIG. 6) between the protruding ends of the protruding contacts 15 and the second resistive film 14 on the inner surface of the opposite-side substrate 12 is 0.5 µm, 1.0 µm, or 2.0 µm.

Since the first resistive film 13 is electrically connected to the second resistive film 14 when the protruding contact 15 comes into contact with the second resistive film 14 as the touch-side substrate 11 bends and deforms upon touching the outer surface of the touch-side substrate 11, the bending/deformation amount of the touch-side substrate 11 which is required to electrically connect the first resistive film 13 to the second resistive film 14 is a very small value, i.e., 2.0 µm, 1.0 µm, or 0.5 µm, corresponding to the gap Δd between the protruding end of the protruding contact 15 and the second resistive film 14.

For this reason, the touch panel 10 can reduce the refraction of transmitted light at a portion which is bent/deformed by a touch on the touch-side substrate 11. Therefore, the display apparatus with the touch panel shown in FIG. 1 allows the user to observe a displayed image on the display panel 1 without almost causing any deformation at a bent/deformed portion of the touch-side substrate 11.

In addition, since the touch panel 10 has the insulating liquid or insulating liquid crystal 28 sealed in the space between the pair of the substrates 11 and 12, it is possible to reduce the reflection and refraction of light transmitted through the touch panel 10 by the interfaces between the opposite-side substrate 12 and the touch-side substrate 11, and the insulating liquid or insulating liquid crystal 28. This allows the user to observe a displayed image on the display panel 1 with sufficient brightness.

That is, since the resistive films 13 and 14 made of ITO films or the like are respectively provided on the inner surfaces of the pair of substrates 11 and 12, light transmitted through the touch panel 10 is reflected or refracted by the interface between the touch-side substrate 11 and the first resistive film 13, the interface between the opposite-side substrate.12 and the second resistive film 14, and the interfaces between the first and second resistive films 13 and 14 and the space between the pair of substrates 11 and 12.

However, since the touch panel 10 has the insulating liquid or insulating liquid crystal 28 sealed in the space between the pair of substrates 11 and 12, the refractive index difference between the first and second resistive films 13 and 14 and the space between the pair of substrates 11 and 12 is smaller than when the space is an air layer with a refractive index of 1. Note that the resistive films 13 and 14 made of ITO films or the like have a refractive index of approximately 1.8, and the insulating liquid or insulating liquid crystal 28 has a refractive index falling within the range of approximately 1.4 to 1.5 as described above. Therefore, the refractive index difference between the resistive films 13 and 14 and the insulating liquid or insulating liquid crystal 28 falls within the range of approximately 0.4 to 0.3.

For this reason, in the touch panel 10, the apparent reflection and refraction of light by the interfaces between the substrates 11 and 12 and the insulating liquid or insulating liquid crystal 28 are smaller than when the space is an air layer with a refractive index of 1.

The insulating liquid or insulating liquid crystal 28 is preferably a liquid having a refractive index difference of 0.1 or less relative to the pair of substrates 11 and 12. Sealing a liquid with such a refractive index can more effectively reduce the apparent refraction of light by the interface between the substrates 11 and 12 and the insulating liquid 28.

That is, the pair of substrates 11 and 12 each have a refractive index of approximately 1.5, the insulating liquid or insulating liquid crystal 28 has a refractive index falling within the range of approximately 1.4 to 1.5, and the resistive films 13 and 14 each have a refractive index of approximately 1.8. Therefore, light striking the touch panel 10 in one direction, e.g., from the outer surface of the opposite-side substrate 12, is refracted by the interface between the opposite-side substrate 12 and the second resistive film 14 in a direction in which the angle relative to the normal direction of the touch panel 10 increases, is refracted by the interface between the second resistive film 14 and the insulating liquid or insulating liquid crystal 28 in a direction in which the angle relative to the normal direction decreases, is further refracted by the interface between the insulating liquid or insulating liquid crystal 28 and the first resistive film 13 in a direction in which the angle relative to the normal direction increases, and is refracted by the interface between the first resistive film 13 and the touch-side substrate 11 in a direction in which the angle relative to the normal direction decreases.

However, since the first and second resistive films 13 and 14 each are a very thin film having a thickness of 0.05 to 0.20 μm, it is possible to neglect both the offset between the incident position of light on one of the two interfaces between the second resistive film 14 and the opposite-side substrate 12 and the insulating liquid or insulating liquid crystal 28 and the exit position of light on the other interface, and the offset between the incident position of light on one of the two interfaces between the first resistive film 13 and the insulating liquid or insulating liquid crystal 28 and the touch-side substrate 11 and the exit position of light on the other interface.

Therefore, the offset between the incident position and exit position of light in the touch panel 10 nearly corresponds to the refractive index difference between the pair of substrates 11 and 12 and the insulating liquid or insulating liquid crystal 28. If this refractive index difference is 0.1 or less, it is possible to effectively reduce the apparent refraction of light by the interfaces between the substrates 11 and 12 and the insulating liquid or insulating liquid crystal 28.

In addition, the insulating liquid crystal of the insulating liquid or insulating liquid crystal 28 is preferably an insulating liquid crystal which is optically isotropic at room temperature, e.g., an insulating liquid crystal exhibiting an isotropic phase at a temperature of 5° C. or more. Sealing this insulating liquid crystal can reduce reflection and refraction by the interfaces between the opposite-side substrate 12 and the touch-side substrate 11, and the liquid crystal layer at room temperature.

Furthermore, the touch panel 10 of the above embodiment is provided with the transparent projections 16 corresponding to the height of the protruding contacts 15 at positions on the inner surface of the touch-side substrate 11. The first resistive film 13 is formed on the inner surface of the touch-side substrate 11 so as to cover the projections 16. The protruding contacts 15 are formed by the portions of the first resistive film 13 which cover the projections 16. Therefore, these protruding contacts do not block transmitted light unlike a case in which protruding contacts are formed by a conductive metal on the first resistive film 13. This allows the user to observe a displayed image on the display panel 1 without any black points at portions corresponding to the protruding contacts 15.

Second Embodiment

Figure 9:
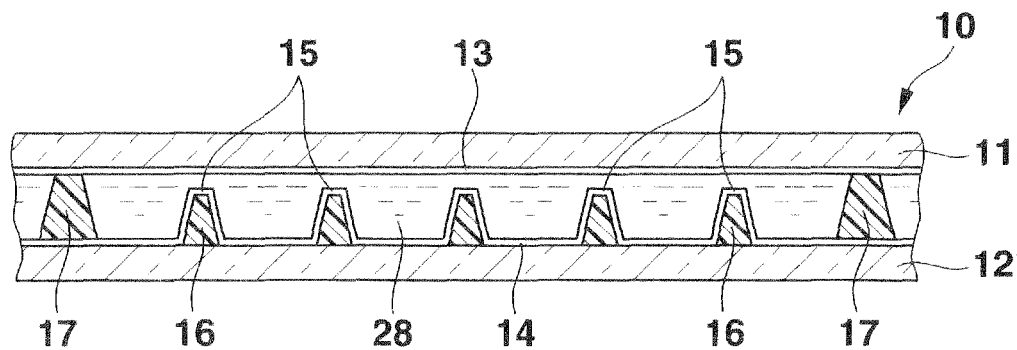
FIG. 9 is an enlarged sectional view of part of a touch panel according to the second embodiment of the present invention.

FIG. 9 is an enlarged sectional view of part of a touch panel according to the second embodiment of the present invention.

A touch panel 10 of this embodiment is provided with protruding contacts 15 at positions on a second resistive film 14 on the inner surface of a opposite-side substrate 12 of a pair of substrates 11 and 12, and columnar spacers 17 on the inner surface (second resistive film 14) of the opposite-side substrate 12. Other arrangements of this touch panel are the same as those in the first embodiment.

Third Embodiment

Figure 10:
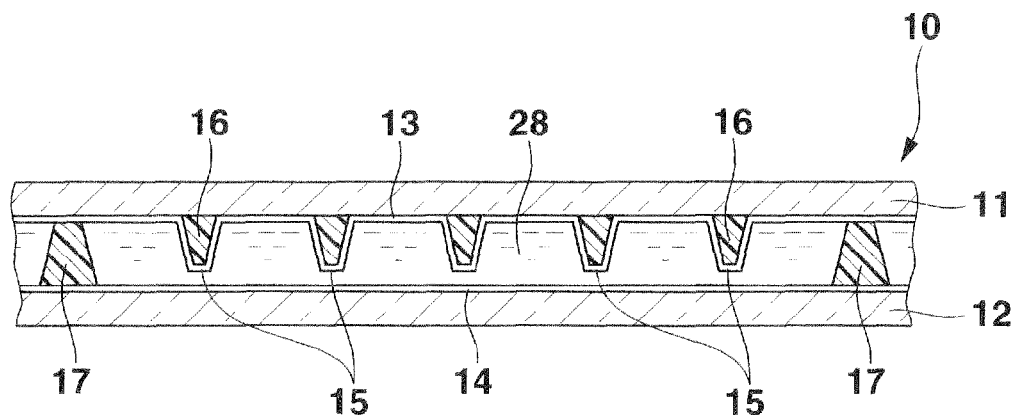
FIG. 10 is an enlarged sectional view of part of a touch panel according to the third embodiment of the present invention.

FIG. 10 is an enlarged sectional view of part of a touch panel of the third embodiment of the present invention.

A touch panel 10 of this embodiment is provided with protruding contacts 15 at positions on a first resistive film 13 on the inner surface of one of a pair of substrates 11 and 12, e.g., the touch-side substrate 11, and columnar spacers 17 on the substrate on which the protruding contacts 15 are not provided, i.e., the inner surface (a second resistive film 14) of the opposite-side substrate 12. Other arrangements of this touch panel are the same as those in the first embodiment.

Fourth Embodiment

Figure 11:
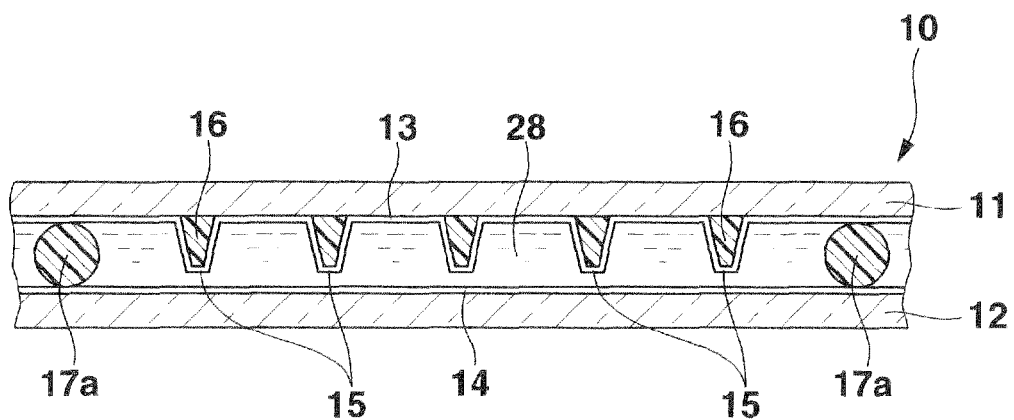
FIG. 11 is an enlarged sectional view of part of a touch panel according to the fourth embodiment of the present invention.

FIG. 11 is an enlarged sectional view of part of a touch panel of the fourth embodiment of the present invention.

A touch panel 10 of this embodiment is configured such that spherical spacers 17*a*, each having a diameter larger than the height of the protruding contacts 15, are arranged at positions other than the positions of protruding contacts 15 between a pair of substrates 11 and 12 in place of the columnar spacers 17 in the first to third embodiments, and the spherical spacers 17*a* define the space between the pair of substrates 11 and 12 to a value larger than the height of the protruding contacts 15. Other arrangements of this touch panel are the same as those of the first embodiment.

Other Embodiments

In the touch panel 10 of each embodiment described above, an insulating liquid crystal which is optically isotropic at room temperature is sealed as the insulating liquid or insulating liquid crystal 28 in the space surrounded by the seal member 24 between the pair of substrates 11 and 12. As the above liquid, an organic or inorganic insulating liquid having a boiling point of 100° C. or more can be used. More specifically, one of the following can be used: organic solvents such as butanol, toluene, xylene, isobutyl alcohol, isopentyl alcohol, isobutyl acetate, butyl acetate, tetrachloroethylene, methyl isobutyl ketone, methyl butyl ketone, ethylene glycol monoether, ethylene glycol monoether acetate, ethylene glycol monobutyl ether, ethylene glycol monomethyl ether, and turpentine oil, and an inorganic liquid such as silicone oil.

In addition, the touch-side substrate 11 is not limited to a glass plate, and may be a resin film. In this case, although the touch-side substrate 11 and the opposite-side substrate 12 have different refractive indexes, the apparent refraction of light by the interfaces between the substrates 11 and 12 and the layer of the insulating liquid or insulating liquid crystal 28 can be sufficiently reduced as long as the refractive index difference with respect to light between at least one of the pair of substrates 11 and 12 and the insulating liquid or insulating liquid crystal 28 is 0.1 or less.

In the above embodiments, the first electrodes 18a and 18b and the second electrodes 19a and 19b each are formed into a continuous strip shape. However, the first electrodes 18a and 18b and the second electrodes 19a and 19b may be intermittently provided at a predetermined pitch so as to correspond to nearly the entire lengths of the side portions of the two ends of the first resistive film 13 in the X-axis direction and nearly the entire lengths of the side portions of the two ends of the second resistive film 14 in the Y-axis direction. In this case as well, voltages alternately applied between the two ends of the first resistive film 13 in the X-axis direction and between the two ends of the second resistive film 14 in the Y-axis direction are made to evenly act on nearly the entire areas of the first resistive film 13 and second resistive film 14, thereby accurately detecting the X- and Y-coordinates x and y of the touched point.

As described above, when the first electrodes 18a and 18b and the second electrodes 19a and 19b are intermittently provided so as to correspond to nearly the entire lengths of the side portions of the two ends of the first resistive film 13 in the X-axis direction and nearly the entire lengths of the side portions of the two ends of the second resistive film 14 in the Y-axis direction, the first electrodes facing the side portion of one end of the first resistive film 13 in the X-axis direction, the first electrodes facing the side portion of the other end of the first resistive film 13 in the X-axis direction, the second electrodes facing the side portion of one end of the second resistive film 14 in the Y-axis direction, and the second electrodes facing the side portion of the other end of the second resistive film 14 in the Y-axis direction are commonly connected to each other, and are respectively connected to the driving circuit connecting terminals 20a, 20b, 21a, and 21b provided on the overhanging portion 12a of the opposite-side substrate 12 through the lines 22a, 22b, 23a, and 23b.

In addition, in the above embodiments, the edge portion of the other end of the first resistive film 13 in the X-axis direction is electrically connected to the first electrodes 18a and 18b, provided on these end portions so as to face each other, through the spherical conductive particles 25 dispersed in the seal member 24. However, the side portion of the other end of the first resistive film 13 in the X-axis direction may be electrically connected to the first electrodes 18a and 18b through a columnar conductive member provided on one of the first electrodes 18a and 18b so as to correspond to the seal portion formed by the seal member 24.

Figure 12A:
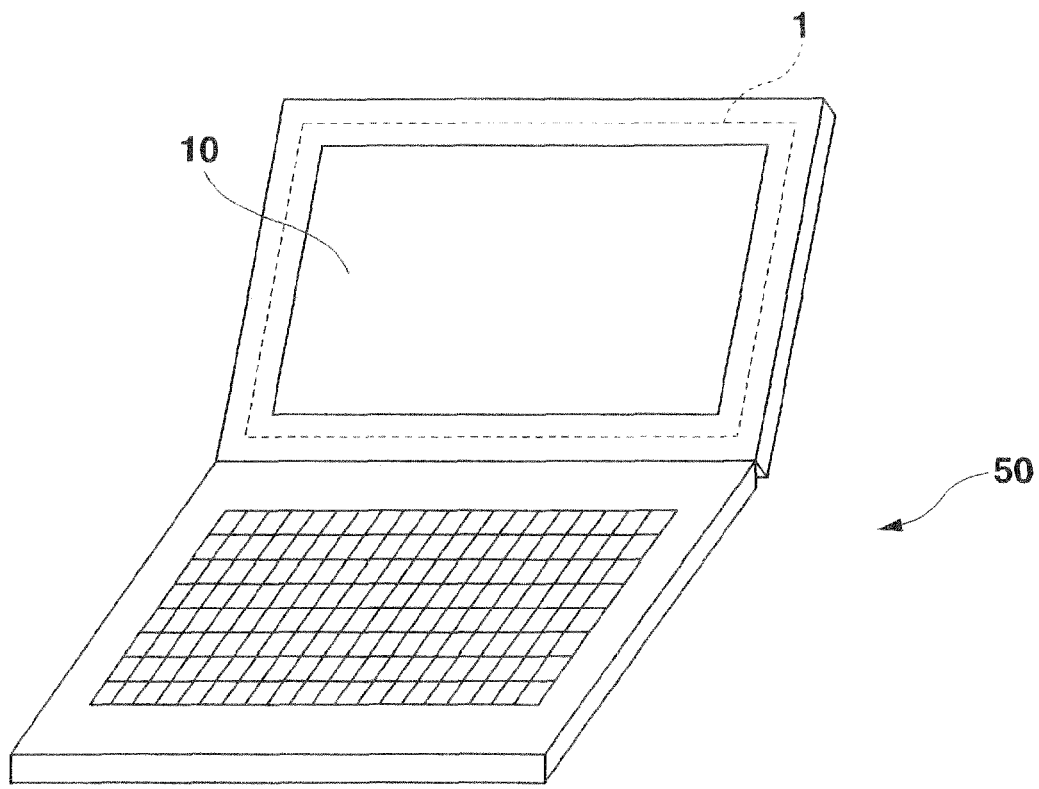
FIG. 12A is a perspective view of an electronic device including the touch panel of the present invention.
Figure 12B:
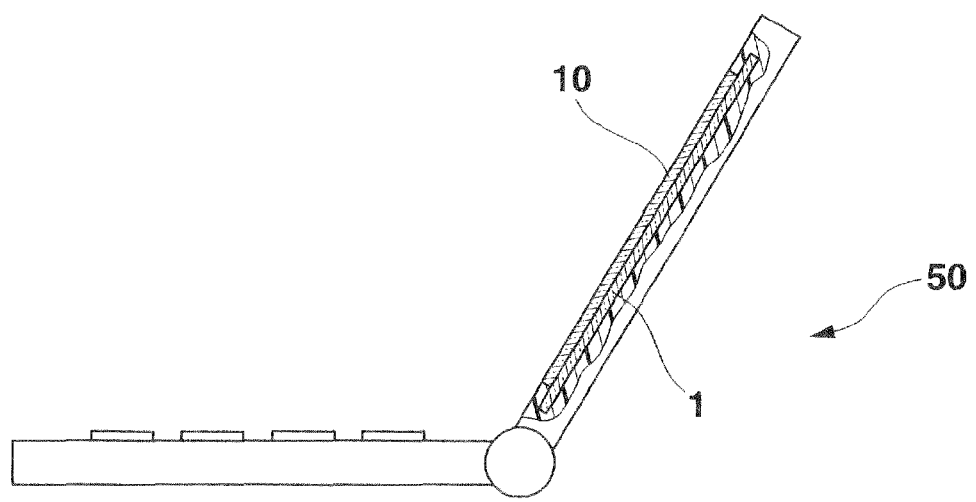
FIG. 12B is a sectional view of the electronic device including the touch panel of the present invention.

Furthermore, the touch panel of the present invention can be mounted on an electronic device such as a notebook PC, PDA, or digital camera. FIG. 12A is a perspective view of a note PC which is an electronic information apparatus 50 including the touch panel 10 of the present invention. FIG. 12B is a sectional view of the note PC.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A touch panel comprising:
 a first substrate and a second substrate which are arranged so as to face each other;
 a first resistive film provided on a surface of the first substrate facing the second substrate;
 a second resistive film provided on a surface of the second substrate facing the first substrate;
 a protruding contact provided on the surface of the first substrate facing the second substrate and protruding to a predetermined height from the first substrate toward the second substrate, wherein, when the first substrate or the second substrate is pressed, the protruding contact electrically connects the first resistive film and the second resistive film at an area corresponding to a pressed portion due to bending and deforming of the pressed substrate;
 an insulating spacer arranged between the first substrate and the second substrate and defining a height of a space between the first substrate and the second substrate to be larger than the height of the protruding contact;
 a frame-like seal member which seals the space between the first substrate and the second substrate throughout peripheral portions of the first substrate and the second substrate; and
 an insulating liquid sealed in the space between the first substrate and the second substrate surrounded by the seal member,
 wherein the insulating spacer is arranged in an area surrounded by the seal member, and is positioned at one of a plurality of first lattice points which are arranged in a first direction at a first interval and in a second direction orthogonal to the first direction at a second interval,
 wherein the protruding contact is arranged in the area surrounded by the seal member, and is positioned at one of a plurality of second lattice points, excluding lattice points overlapping with the plurality of first lattice points, wherein the plurality of second lattice points are arranged in the first direction at a third interval which is narrower than the first interval and are arranged in the second direction at a fourth interval which is narrower than the second interval, and
 wherein the first interval is set to be an integral multiple of the third interval, the second interval is set to be an integral multiple of the fourth interval, and each of the plurality of first lattice points in the area surrounded by the seal member is set to overlap with one of the plurality of second lattice points.

2. The touch panel according to claim 1, wherein the protruding contact comprises a resin portion formed into a protruding shape and one of the first resistive film and the second resistive film which covers the resin portion.

3. The touch panel according to claim 1, wherein the insulating spacer comprises a columnar spacer which is provided on one of the first resistive film and the second resistive film and includes a distal end in contact with the other resistive film.

4. The touch panel according to claim 3, wherein the columnar spacer is provided on the first substrate on which the protruding contact is provided.

5. The touch panel according to claim 3, wherein the columnar spacer is provided on the second substrate on which the protruding contact is not provided.

6. The touch panel according to claim 3, wherein the protruding contact is formed by providing, on the surface of the first substrate facing the second substrate, a projection corresponding to the height of the protruding contact, and forming the first resistive film so as to cover the projection.

7. The touch panel according to claim 6, wherein the columnar spacer and the projection are formed by a same material.

8. The touch panel according to claim 1, wherein the insulating spacer comprises a spherical spacer.

9. The touch panel according to claim 1, wherein the insulating liquid has a predetermined resistance value.

10. The touch panel according to claim 1, wherein the insulating liquid has a refractive index difference of not more than 0.1 with respect to visible light relative to the first substrate and the second substrate.

11. The touch panel according to claim 1, wherein the insulating liquid comprises a liquid crystal material which is optically isotropic at room temperature.

12. The touch panel according to claim 1, wherein the insulating liquid comprises one of an organic material and an inorganic material having a boiling point of not less than 100° C.

13. The touch panel according to claim 1, wherein the second substrate includes a protruding portion that protrudes with respect to the first substrate, and the protruding portion is provided with terminals which electrically connect the first resistive film and the second resistive film to a touch panel driving circuit.

14. The touch panel according to claim 13, wherein a conductive member which electrically connects the first resistive film to the second substrate is arranged in an area in which the seal member is arranged.

15. The touch panel according to claim 1, wherein each of the first resistive film and the second resistive film is formed into one film.

16. The touch panel according to claim 15, further comprising a touch panel driving circuit which detects a contact position at which the first resistive film comes into contact with the second resistive film.

17. The touch panel according to claim 1, wherein the insulating liquid comprises a material exhibiting an isotropic phase at a temperature of 5° C. or more.

18. The touch panel according to claim 1, wherein the first interval and the second interval are set to equal values, and the third interval and the fourth interval are set to equal values.

19. An electronic device comprising a touch panel, wherein the touch panel includes:
　a first substrate and a second substrate which are arranged so as to face each other;
　a first resistive film provided on a surface of the first substrate facing the second substrate;
　a second resistive film provided on a surface of the second substrate facing the first substrate;
　a protruding contact provided on the surface of the first substrate facing the second substrate and protruding to a predetermined height from the first substrate toward the second substrate, wherein when the first substrate or the second substrate is pressed, the protruding contact electrically connects the first resistive film and the second resistive film at an area corresponding to a pressed portion due to bending and deforming of the pressed substrate;
　an insulating spacer arranged between the first substrate and the second substrate and defining a height of a space between the first substrate and the second substrate to be larger than the height of the protruding contact;
　a frame-like seal member which seals the space between the first substrate and the second substrate throughout peripheral portions of the first substrate and the second substrate; and
　an insulating liquid sealed in the space between the first substrate and the second substrate surrounded by the seal member,
　wherein the insulating spacer is arranged in an area surrounded by the seal member, and is positioned at one of a plurality of first lattice points which are arranged in a first direction at a first interval and in a second direction orthogonal to the first direction at a second interval,
　wherein the protruding contact is arranged in the area surrounded by the seal member, and is positioned at one of a plurality of second lattice points, excluding lattice points overlapping with the plurality of first lattice points, wherein the plurality of second lattice points are arranged in the first direction at a third interval which is narrower than the first interval and are arranged in the second direction at a fourth interval which is narrower than the second interval, and
　wherein the first interval is set to be an integral multiple of the third interval, the second interval is set to be an integral multiple of the fourth interval, and each of the plurality of first lattice points in the area surrounded by the seal member is set to overlap with one of the plurality of second lattice points.

* * * * *